June 12, 1956  E. W. MILLER  2,749,803
GEAR CUTTING MACHINE

Filed Sept. 25, 1951  11 Sheets-Sheet 1

FIG. 1.

INVENTOR.
EDWARD W. MILLER
BY
John Morton
HIS ATTORNEY

FIG. 2

INVENTOR.
EDWARD W. MILLER
BY John Morton
HIS ATTORNEY June 12, 1956 E. W. MILLER 2,749,803
GEAR CUTTING MACHINE Filed Sept. 25, 1951 11 Sheets-Sheet 8

INVENTOR.
EDWARD W. MILLER
BY John Morton
HIS ATTORNEY

Fig. 24.

June 12, 1956  E. W. MILLER  2,749,803
GEAR CUTTING MACHINE
Filed Sept. 25, 1951  11 Sheets-Sheet 11

INVENTOR.
EDWARD W. MILLER
BY John Morton
HIS ATTORNEY

United States Patent Office 2,749,803
Patented June 12, 1956

2,749,803

GEAR CUTTING MACHINE

Edward Whitney Miller, Springfield, Vt., assignor to The Fellows Gear Shaper Company, Springfield, Vt., a corporation of Vermont Application September 25, 1951, Serial No. 248,221

8 Claims. (Cl. 90—1.6)

The present invention is concerned with a gear cutting and finishing machine for cutting or finishing the teeth of gears in either the rough or finish form. One of the primary objects of this invention is to provide a simple and efficient means for correlating the movement of the cutter and the work and to give the necessary relative movements to both cutter and work in a simple and expeditious manner.

A second object is to provide a machine in which a cutter similar to a gear shaper cutter can be employed and which, operating on a cross-axis relation with respect to the work, can finish a gear at relatively high speed compared with previous machines.

Another object is to provide a complete machine with the necessary instruments for moving and correlating the various elements in the machine.

The machine herein concerned is a machine somewhat similar to that shown in my co-pending application No. 168,821 filed June 17, 1950, Patent No. 2,696,762, December 14, 1954.

In the drawings.

Like reference characters designate the same parts wherever they occur in all the figures.

Figure 3:
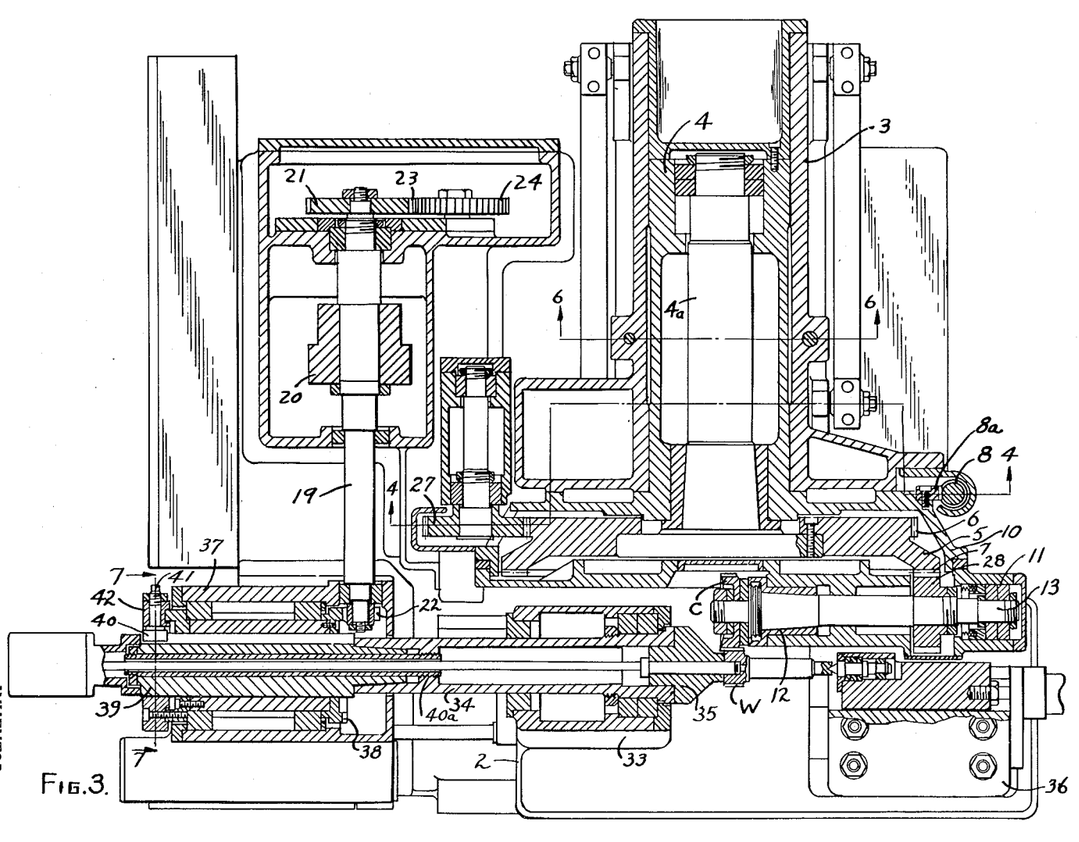
Figure 3 is a view taken along the line 3—3 of Figure 2.
Figure 4:
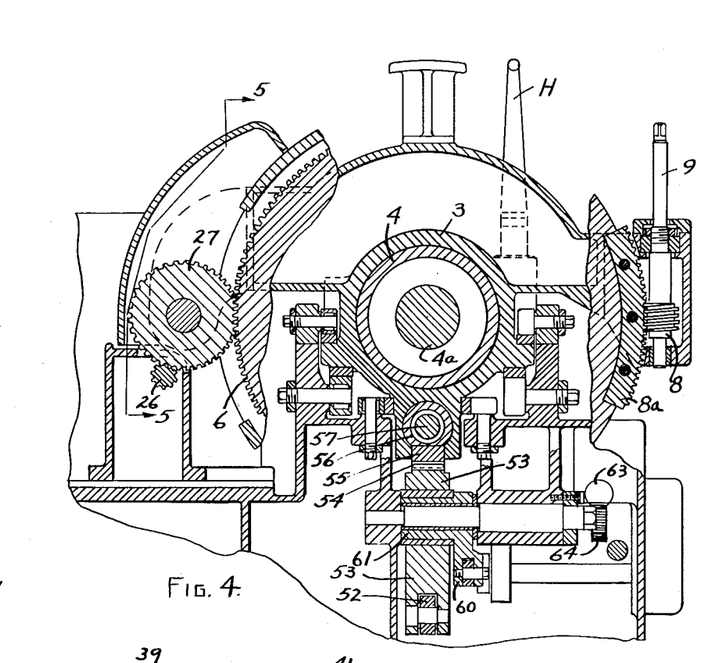
Figure 4 is a view taken along the line 4—4 of Figure 3.
Figure 5:
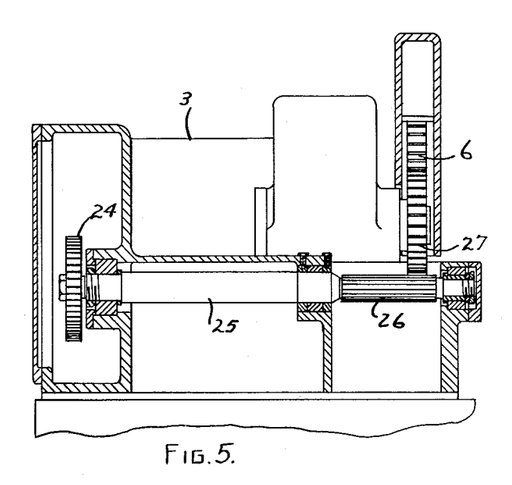
Figure 5 is a view along the line 5—5 of Figure 4.

The machine comprises a base 1 on which is mounted a work table 2. Also mounted on the base 1, at substantially right angles to table 2, is a slide member 3 in which is journaled an elongated bearing member 4. This member 4 is mounted to rotate in the slide 3. Mounted in the member 4 is a spindle 4a. This spindle 4a carries on its outer end a member 5 on which is formed a spur gear 6, and a face gear 7. The member 4 is rotatably adjustable in the slide member 6 and, as shown in Figure 3 and Figure 4, may be adjusted through the medium of a worm wheel segment 8a which meshes with a worm 8 mounted on the slide 3. This worm 8 is formed on a shaft 9 which may be manually rotated. This rotation serves to adjust the cutter to the desired angular position.

Figure 6:
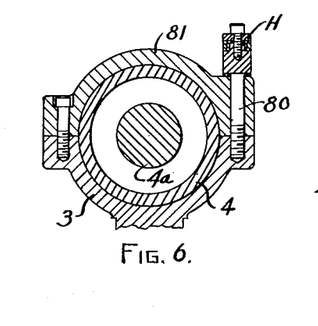
Figure 6 is a partial section along the line 6—6 of Figure 3.

After the member 4 has been adjusted to the desired angular position, it may be loaded by rotating the handle H which rotates the screw 80, shown in Figure 6, which draws the cap 81 firmly about the member 4.

The member 4 has an enlarged outer end 10, and this outer end provides bearings such as is shown at 11 and 12 for the cutter spindle 13. Mounted on the end of the cutter spindle is a cutter C.

When a gear shaper type cutter is to be used, the front or cutting face is usually disposed in a plane in which lies the axis of rotation of the member 4.

Figure 9:
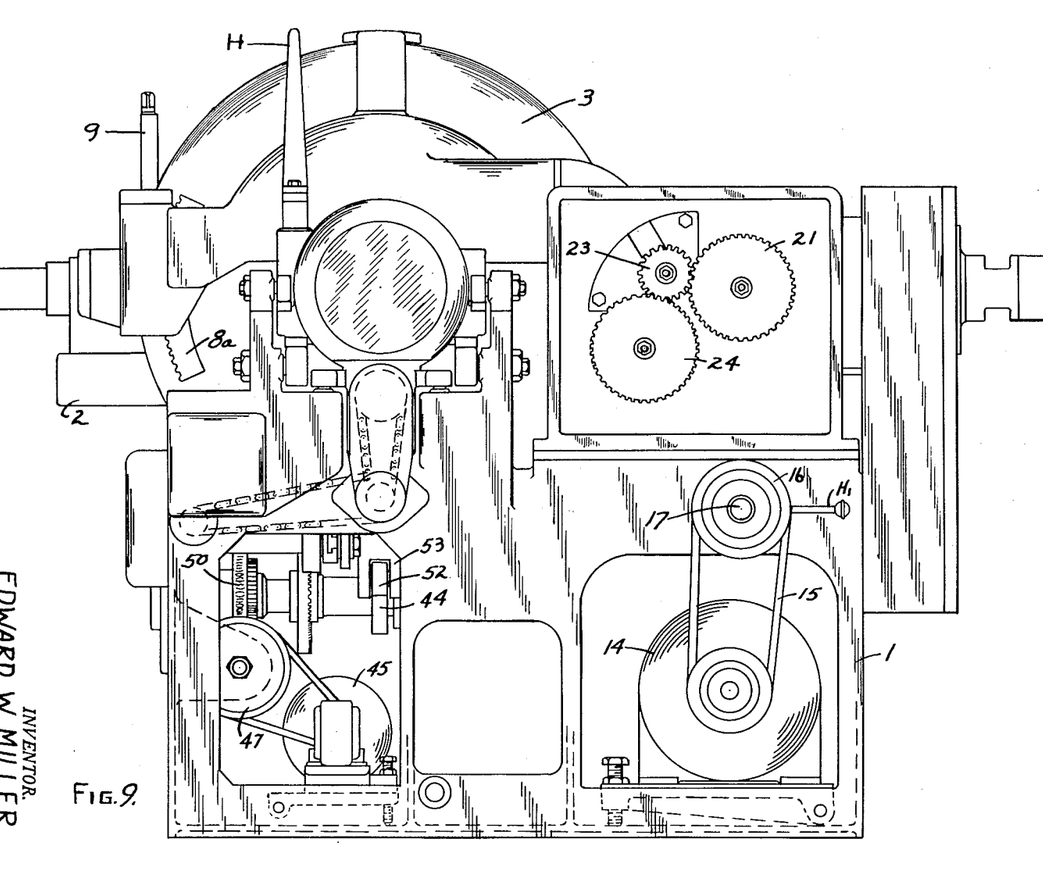
Figure 9 is a rear view of the machine.
Figure 20:
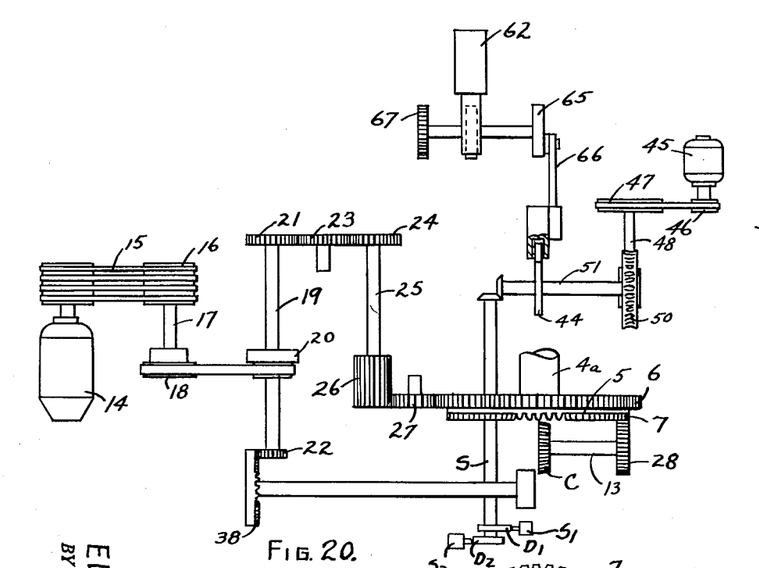
Figure 20 through Figure 23 show the drive connections to the various elements.
Figure 21:
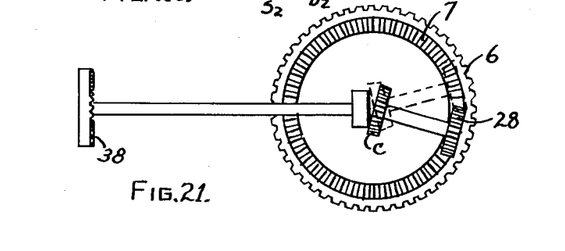

As shown in Figure 20, the cutter is rotated from a main drive motor 14 through a belt drive 15 to the pulley 16. This pulley 16 is mounted on a shaft 17 on which is mounted a pulley 18. The drive through belt 15 and pulley 16 may be a well-known commercial variable speed drive and the speed of rotation of shaft 17 may be changed by shifting the handle $H_1$ shown in Figure 9. A shaft 19 is provided, and this shaft 19 has a pulley 20 intermediate to its desired end, a cutter drive gear 21 on one end thereof, and a work drive gear 22 on its opposite end.

The gear 21 meshes with a change gear 23 which drives a gear 24 on shaft 25. The shaft 25 has an elongated gear 26 thereon which meshes with and drives a gear 27 which in turn meshes with the gear 6 on the member 5. The face gear 7 meshes with a pinion 28 which is keyed to the work spindle 13. From the above it will be seen that the main drive motor 14 is arranged so as to drive the cutter C at the desired speed and which speed can be changed through the medium of the change gears 23 or 27.

The work table 2 is reciprocated hydraulically from a cylinder 31 having a piston 30a thereon, which piston has a piston rod 30. The cylinder 31 is fixed to the base 1 and the piston rod 30 is threadedly connected to the work slide 2 at the point 32. Upon admission of fluid in opposite sides of the piston 30a, it will be seen that the work table 2 will be caused to be reciprocated.

On the work table 2 is mounted a headstock 33 which is shown in section in Figure 3. In this headstock 33 is rotatably journaled a work spindle 34. On the end 35 of said work spindle, any appropriate means may be provided for mounting the work piece W. If desired, a tailstock 36 may also be employed to support the work W.

Figure 1:
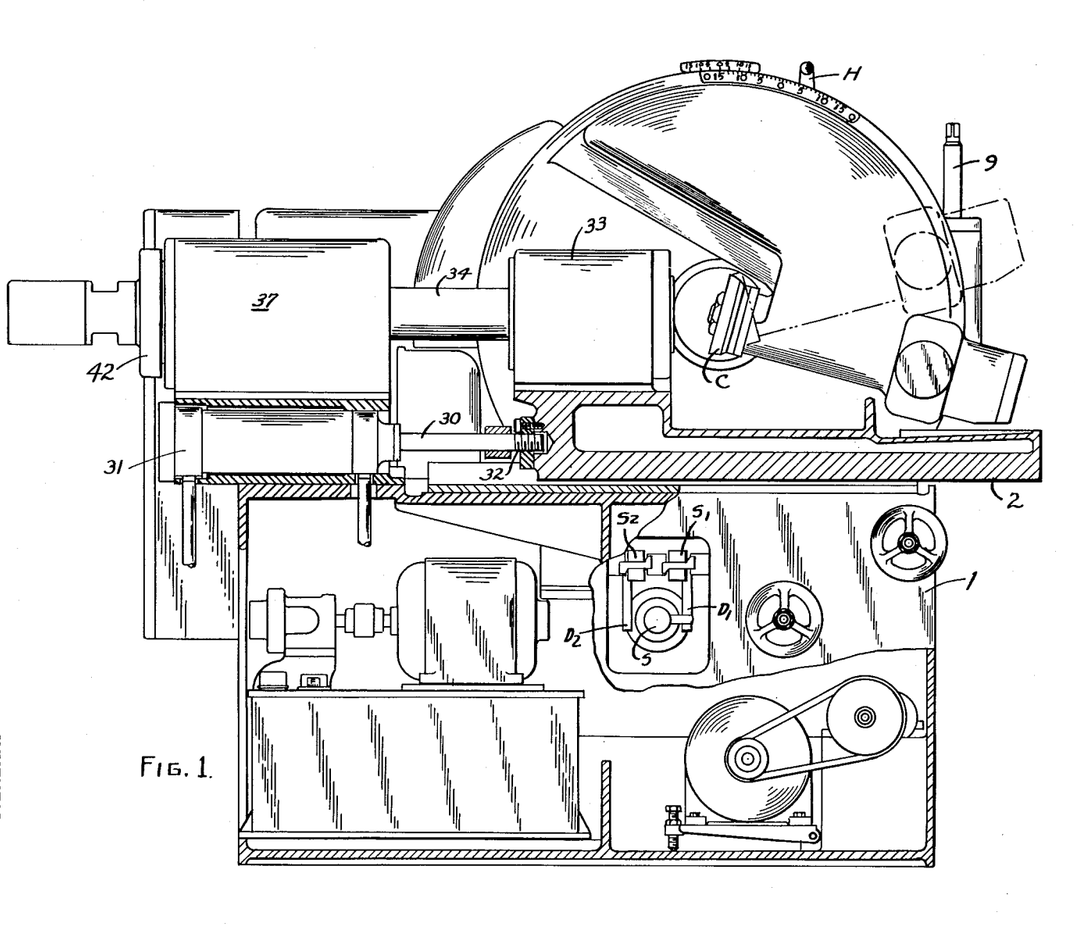
Figure 1 is a front view of the machine partially in section with the tailstock and work removed.

As shown in Figure 1, above the piston 31 is a guide housing 37. This guide housing encases the drive to the work spindle and also a means for imparting the necessary incremental rotation to the work to produce any necessary helical movement of the work with respect to the cutter. The drive to the work spindle is taken from the gear 22 which engages the face gear 38 which is fixed and held against rotation on the work spindle 34.

Figure 7:
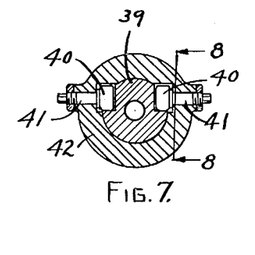
Figure 7 is a view along the line 7—7 of Figure 3.
Figure 8:
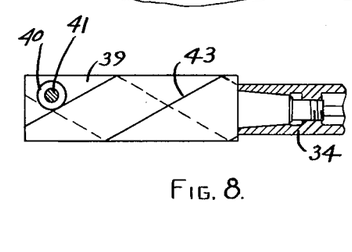
Figure 8 is a partial view looking in the direction of the arrows 8—8 of Figure 7.

In the housing 37 is mounted a helical guide member 39. As shown in Figures 3, 7, and 8, this guide member is connected to the work spindle in any appropriate manner such as shown at 40 in Figure 3. Adjacent to the outer end of the housing 37 are mounted roll members 40. These roll members are formed on the inner ends of pins 41 which are journaled in the member 42 which is fixed to the guide housing 37 and held against any movement with respect thereto. It will be seen that as the work table 2 is reciprocated, carrying with it the work spindle 34 and also the guide member 39 which is fixed to the work spindle, that due to helical guide surfaces 43 formed on the guide member 39, which surfaces coact with the rollers 40, that a helical movement will be given to the work piece. Any desired amount of movement can be obtained by merely changing the helical guide 39 so as to provide helices of different amounts on the guide surfaces 43. If it is desired to finish spur gears on the machine, a guide will be used with a helix of 0°.

Figure 2:
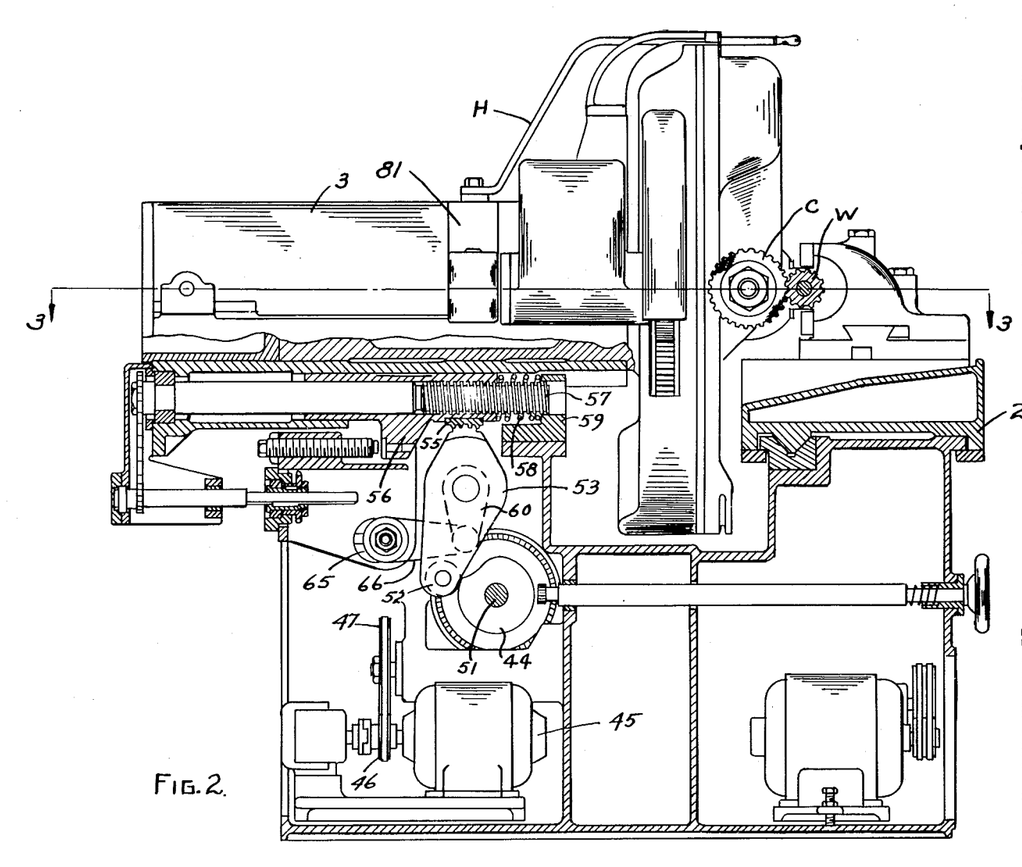
Figure 2 is a side view of the machine partially in section showing the cutter and work in inter-meshing relation.
Figure 22:
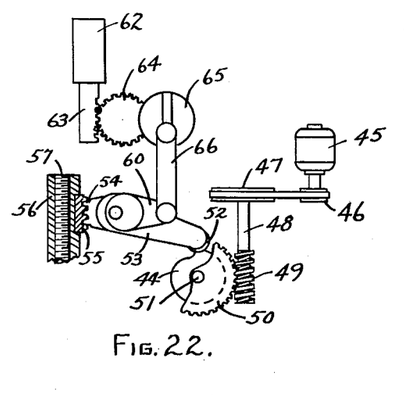
Figure 23:
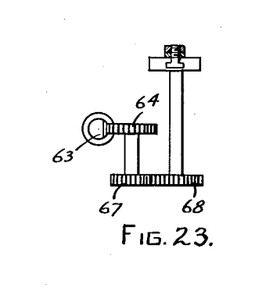

In order to feed the cutter into depth, a depth feed cam 44 is employed. Through connections described below, this depth feed cam is operated to feed the member 3 to the right as shown in Figure 2 and so produce the depth feed of the cutter C into the work piece W. As shown in Figure 2 and Figure 22, this depth feed cam 44 is driven from a depth feed motor 45 which drives a pulley 46 which is in turn belted to a pulley 47 fixed to the work shaft 48 which carries thereon a worm 49. This worm 49 meshes with a worm wheel 50 which is fixed to the shaft 51 to which in turn is fixed the depth feed cam 44. The depth feed cam is arranged to abut a roller 52 which is carried on the rocker arm 53. This rocker arm is journaled in the base of the machine in the manner described below and carries at its end opposite to the end carrying the roller 52 a gear segment 54 which meshes with a rack 55 formed on a nut member 56. This nut member is threaded on a feed screw 57 which is arranged to move with the slide member 3. A spring 58 is provided which abuts an abutment member 59 fixed to the base 1 of the machine at one end, and on the other end the spring member 58 abuts the nut 56. This spring 58 serves to hold the roller 52 tightly against the feed cam 44.

The depth feed cam is preferably stopped at three positions during the machine cycle. At the first position, the work gear is brought into mesh with the cutter; in the second position, the cutter is backed off to allow the work table to traverse back to the start of the cutting position; and the third position is the full depth of cut necessary to finish the gear.

The depth feed cycle is determined from switches $S_1$ and $S_2$. Mounted on shaft S, Figure 12, which is geared to shaft 51, are dogs $D_1$ and $D_2$ which actuate the switches $S_1$ and $S_2$. These switches coact with traverse limit switches $LS_3$ and $LS_4$ controlling the travel of the work slide 2 to control the depth feed cycle.

A means is provided to move the cutter in and out during the course of reciprocation of the work piece so that if desired, teeth may be formed on the work which are bowed longitudinally thereof. In order to achieve this bowing or crowning effect, a second arm 60 is provided on which is mounted the rocker arm 53. The arm 60 has an eccentric hub thereon as shown in Figure 4. This hub 61 carries the arm 53. It will be seen that if the eccentric hub 61 is rotated, it will change the amount of depth feed given to the cutter through the depth feed cam 44 and the rock arm 53. In order to rotate the eccentric hub 61, a cylinder and piston arrangement 62 is provided. The piston of the arrangement has formed thereon rack teeth 63 which engage teeth on an idler gear 64. This idler gear 64 is fixed on a shaft carrying gear 67 which engages gear 68 and drives crank 65 which drives a crank arm 66 to oscillate the arm 60 about its center.

Figures 10, 11, 12, 13:
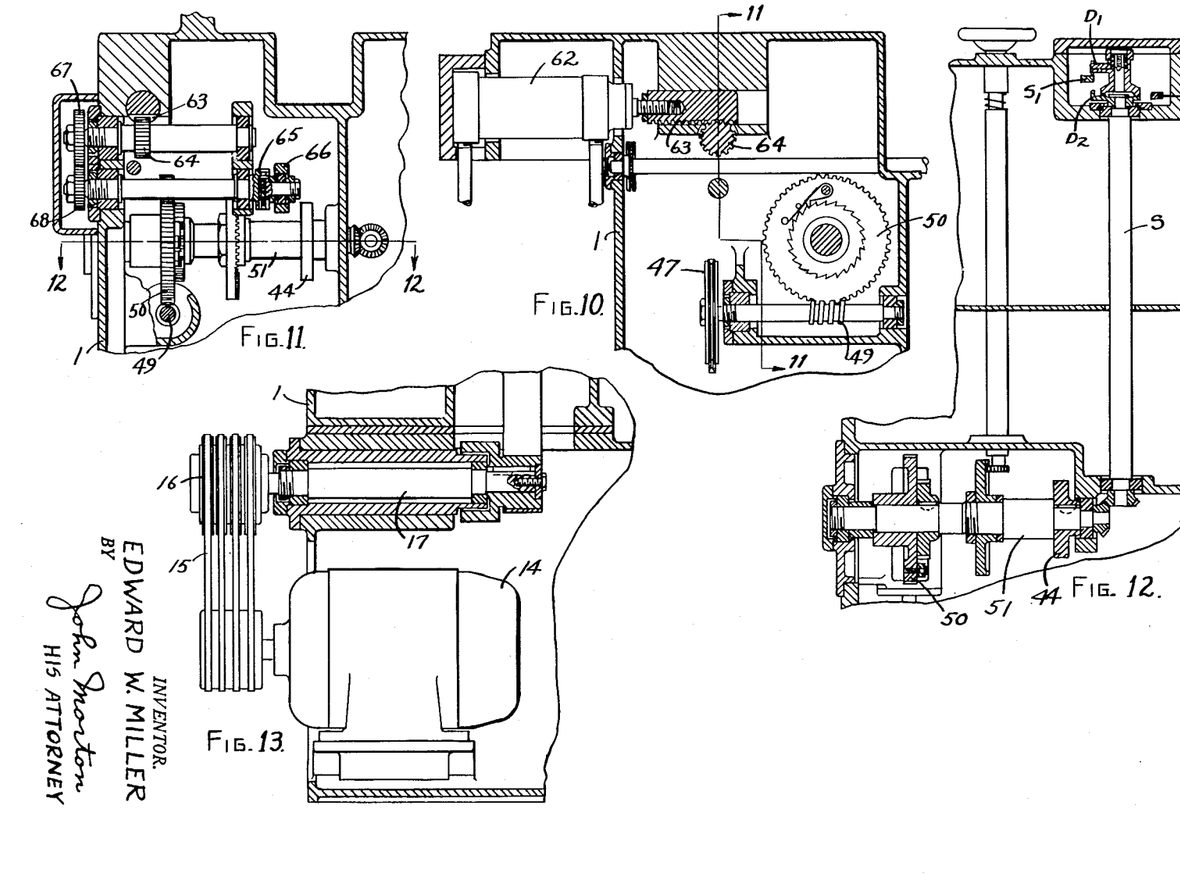
Figure 10 is a partial section showing the drive to the depth feed cam and to the crowning mechanism.
Figure 11 is a partial section taken along the line 11—11 of Figure 10.
Figure 12 is a section along the line 12—12 of Figure 11.
Figure 13 shows the main drive motor and its driving connections.

From this will be seen that when fluid is admitted to the cylinder and piston arrangement 62, that the eccentricity of the hub member 61 will be changed with respect to the rocker arm and that a varying amount of depth feed will be given to the cutter C and that the work will be formed with crowned side faces. By adjusting the throw of the crank and crank arm 65, 66, various amounts of variations of tooth thickness may be obtained. As shown in Figure 11, the drive to the crank 65 through a pair of gears 67 and 68, and by suitably selecting the gears 67 and 68, the cutter may be arranged to suit the position of the high speed of the crown to be formed on the gear.

Figure 14:
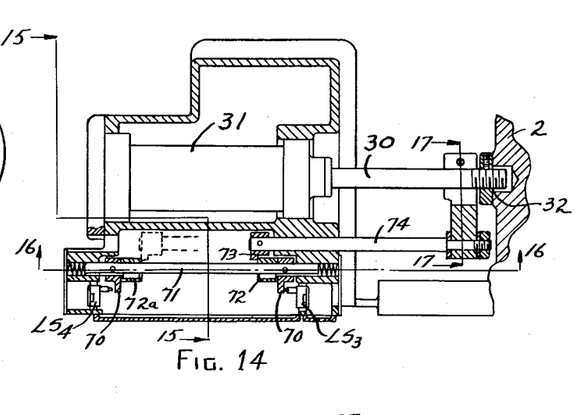
Figure 14 is a partial section through the drive to the work slide showing the dog arrangement for controlling the reciprocation of the work slide.
Figure 15:
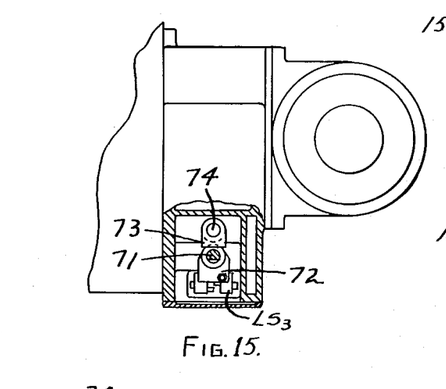
Figure 15 is a view along the line 15—15 of Figure 14.
Figures 16, 17, 18, 19:
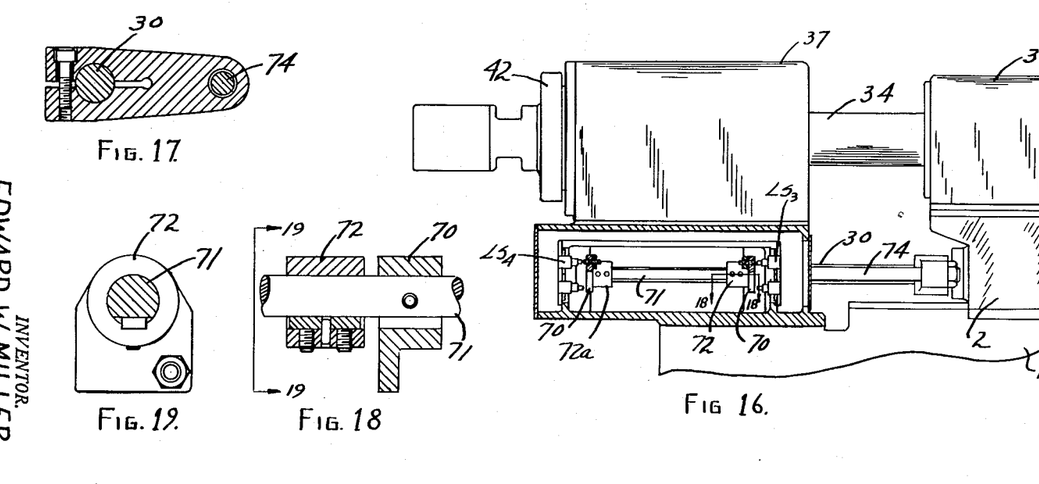
Figure 16 is a view along the line 16—16 of Figure 14.
Figure 17 is a partial enlarged section along the line 17—17 of Figure 14.
Figure 18 is an enlarged view along the lines 18—18 of Figure 16.
Figure 19 is an end view enlarged of the elements shown in Figure 18.
Figure 24:
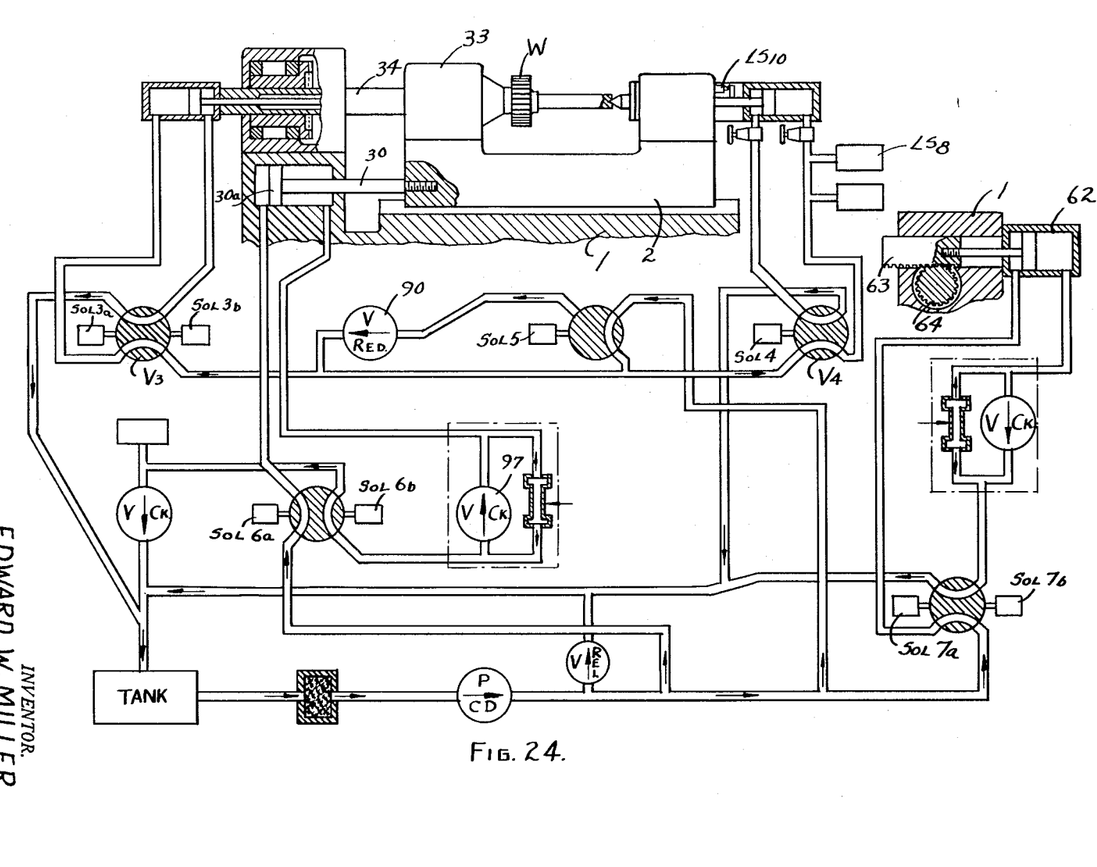
Figure 24 shows a hydraulic system which may be employed to function the various machine parts.

The speed of the travel of the work table is governed through a flow control valve as shown in Figure 24. The limits of the table travel are controlled by electrical limit switches which are connected to solenoid valves. Mounted on the frame 1 and adjacent to the piston and cylinder element 31, is a rod 71 which carries thereon dogs 70. Adjustable stops 72 and 72a are mounted on the rod 71 and these stops are actuated by a dog 73 which is fixed to the rod 74 which is fastened to the work slide as shown in Figure 14. Limit switches $LS_4$ and $LS_3$ are actuated by the dogs 70.

As disclosed in my prior filed application referred to above, a work guard may be employed which is automatically brought into and out of operative position in time with the operative cycle of the machine.

The hydraulic and electrical control elements are essentially the same as those disclosed in my prior filed application. It will be obvious to anyone skilled in the art that any equivalent of these controls may be employed, and the specific controls shown in Figures 24 and 25 of the present application do not constitute a part of my present invention.

Figure 25:
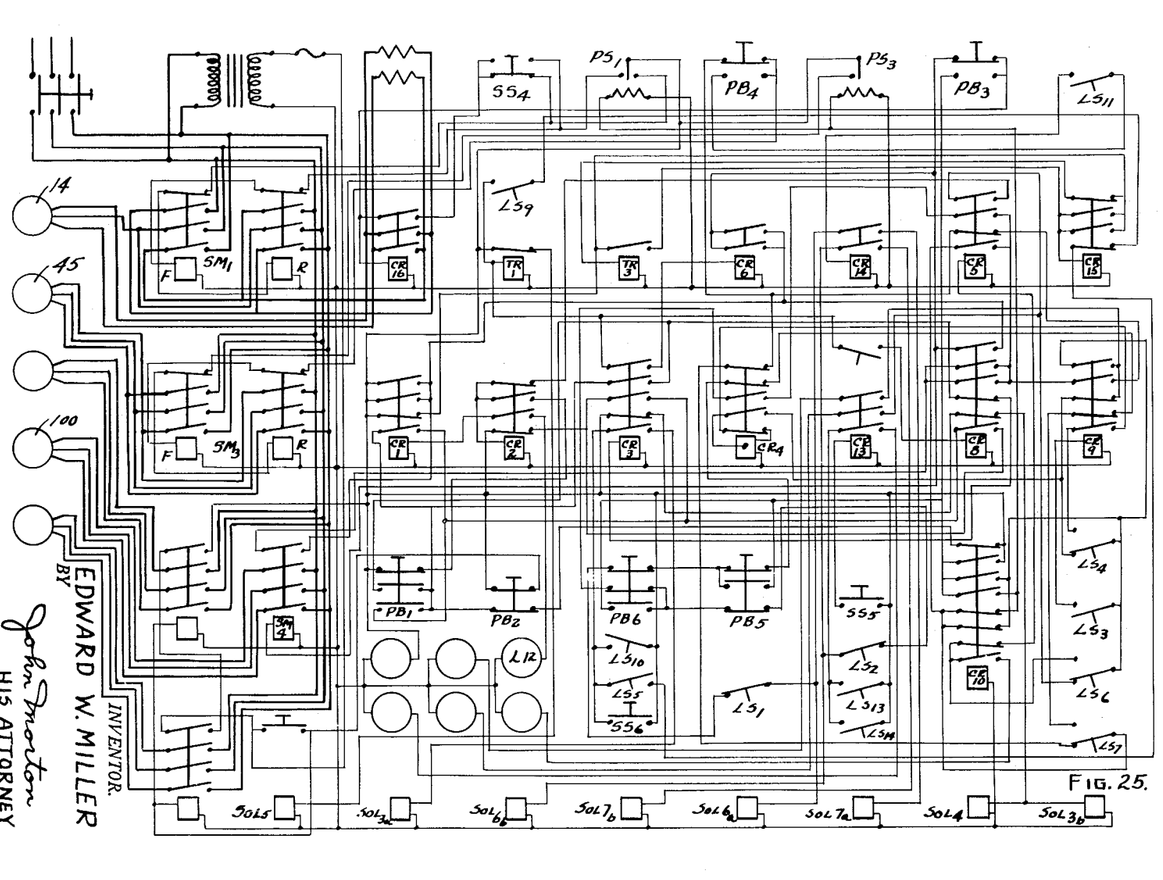
Figure 25 is an electrical diagram showing one possible electrical circuit which may be employed.

As shown in Figure 25, a push button $PB_1$ is pressed to start the machine operation. Solenoid $SOL_4$ and solenoid $SOL_{3b}$ become de-energized and oil is admitted through valve $V_4$ to advance the tailstock at low pressure. Switch $LS_{10}$ closes with the tailstock in cutting position.

Solenoid $SOL_{3a}$ then energizes and admits low pressure to advance the work holding portion of the work spindle into position, and at this time the mechanical guard mentioned above is lowered. The contact $LS_9$ closes and the tool and cutter rotation begins due to the fact that the motor $M_{14}$ becomes energized. After a short period of time determined by the timer $TR_1$, the solenoid $SOL_5$ will become de-energized. The pressure switch $LS_8$ will close upon admission of high pressure to the tailstock.

When high pressure has been applied to both the head and tailstock, the depth feed motor 45 is started. Upon the starting of the depth feed motor 45 the depth feed cam 44 moves to its first position and the switch $LS_7$ is actuated. Upon actuation of the switch $LS_7$, the solenoid $SOL_{6a}$ and solenoid $SOL_{7a}$ become energized to move the work table and the crowning mechanism rapidly. At the end of the rapid movement of the work table, the switch $LS_3$ operates to de-energize solenoid $SOL_{6a}$ and solenoid $SOL_{7a}$ to stop the traverse and crowning operation.

At this time the depth feed motor 45 again is energized to move the depth feed cam to its second position. When the depth feed cam is moved to its second position, the work table starts its slow feed to obtain a cutting action between the cutter C and the work W. Solenoid $SOL_{6b}$ and solenoid $7b$ are then energized. At the end of the cutting traverse switch $LS_4$ is actuated to stop the movement of the work table. Then the depth feed motor again becomes energized and the cutter is backed out part way.

Upon the backing out of the cutter, a lamp $L_{12}$ may be provided to show that the cutting cycle is completed. Coil CR₁ is then energized through the action of the coil CR₂.

The main motor 14 is then stopped and timer TR₃ is energized which in turn de-energizes coil CR₁. After the time setting of timer TR₃ allows the motor 14 to come to rest, pressure is reduced on the hydraulic system. Upon the reduction of pressure in the hydraulic system, low pressure is admitted to the headstock and tailstock which are withdrawn from contact with the work, the solenoid SOL₃ᵦ and solenoid SOL₄ are energized at which time the work guard is raised to permit access to the work.

As set forth above, the specific electrical connections and hydraulic supports are not a part of the present invention.

Figure 26:
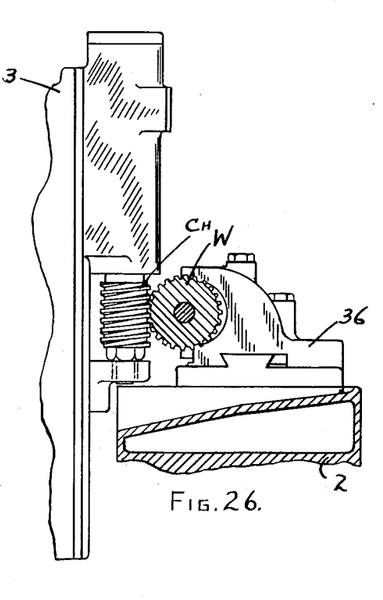
Figures 26 and 27 show another type of cutter which may be employed in a machine of the character herein concerned.
Figure 27:
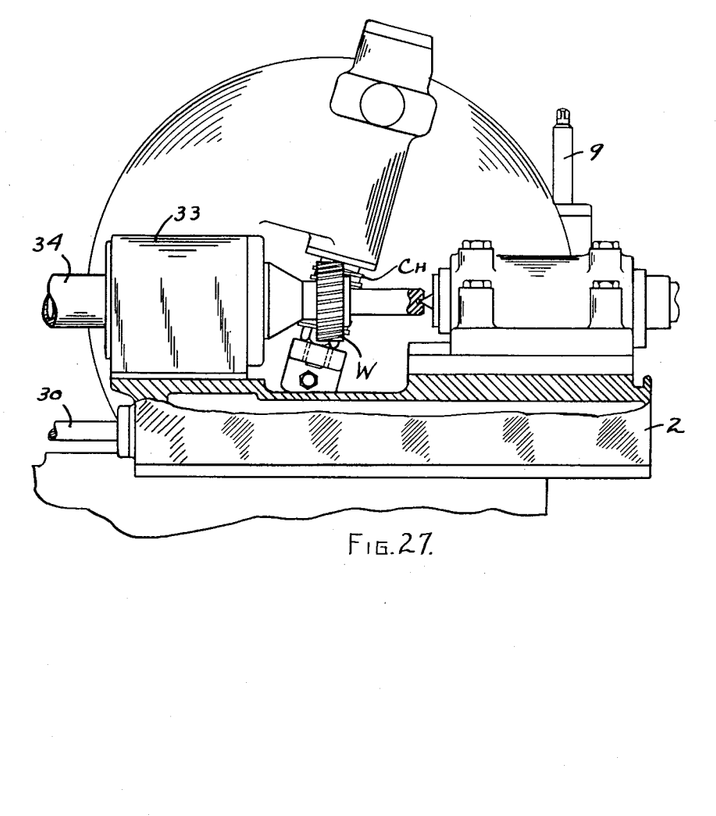

If desired, a different type of cutter may be employed on the machine and this different type of cutter may be a hobbing cutter or the like such as is shown in Figures 26 and 27. To substitute such a cutter on the cutter spindle 13 requires only that the cutter spindle be rotated to the appropriate disposition and the placing of the cutter C*h* on the spindle 13 and the machine may then be operated in the manner set forth above.

What I claim is:

1. In a machine of the character described, a base, a cutter slide moveable on said base, a bearing member mounted to rotate in said slide, a gear member rotatably journalled in to said bearing member, said gear member consisting of a gear having cylindrical gear characteristics, and a face gear fixed to said gear, a cutter carrying spindle mounted on said bearing member, a gear on said spindle meshing with said face gear, a work table on said base, a work spindle mounted to rotate in said work table, means to reciprocate said work table, gearing between said work spindle and said gear having cylindrical gear characteristics so constructed and arranged so as to rotate the cutter spindle and work spindle in timed relation, said gearing including a gear fixed to said work spindle and change gears between said last mentioned gear and said gear having cylindrical gear characteristics, a guide member fixed to said work spindle and spaced axially of said spindle from said gear on said spindle, and means coacting with said guide member to impart an incremental rotation to the work spindle.

2. In a gear cutting machine, a base, a slide mounted to move on said base, means to actuate said slide, a bearing member rotatably adjustable in said slide, means to rotatably adjust said bearing member, a spindle mounted coaxially with said bearing member to rotate in said bearing member, a composite gear member consisting of a face gear and a cylindrical gear fixed to said spindle, a tool spindle mounted on said bearing member having a gear thereon meshing with said face gear, a work table mounted to move on said base in a direction transverse to the direction of movement of said slide, a work spindle rotatably mounted on said table, a face gear fixed to said work spindle, a change gear train connecting said last mentioned face gear to said cylindrical gear whereby said tool and work spindle are rotated in timed relation, a helical guide member fixed to said work spindle and spaced axially thereof from said last mentioned face gear and means coacting with said guide member to impart an incremental rotation to said work spindle upon movement of said work table.

3. A machine as defined in claim 2 in which the means to actuate said slide includes a feed cam mounted in said base, a feed screw arranged to move with said cutter slide, a nut member threaded on said feed screw having rack teeth formed thereon, a rocker arm pivoted in said base, said rocker arm having at one end thereof a gear segment meshing with said rack teeth and means at the other end of said rocker arm abutting said feed cam so that upon movement of said feed cam said slide is actuated.

4. A machine as defined in claim 3 in which said rocker arm is mounted on an eccentric hub, said hub being fixed to a second arm journalled in said base, and means to impart movement to said second arm responsive to movement of said work table.

5. In a gear finishing machine, a base, a work table movable on said base, a work spindle journalled in said work table, a tool slide moveable on said base in a direction transverse to the movement of said work table, means to impart movement to said tool slide, consisting of a feed cam rotatably mounted in said base, a feed cam motor connected to rotate said feed cam, a feed screw arranged to move with said tool slide, a nut member threaded on said feed screw, said nut member having a rack formed thereon, a rocker arm pivotally mounted in said base, said rocker arm having at one end thereof a gear segment meshing with said rack and means at the other end of said rocker arm abutting said feed cam so that upon movement of said feed cam said rocker arm is rotated and said tool slide is moved toward and away from said work table.

6. A machine as defined in claim 5 in which said rocker arm is mounted on an eccentric hub fixed to a second arm journalled in said base, and means to impart movement to said second arm responsive to movement of said work slide.

7. A machine as defined in claim 6 in which said work spindle has fixed thereto a helical guide member and a complemental means coacts with said guide member to impart an incremental movement to said work spindle upon movement of said work table.

8. A machine as defined in claim 5 in which said work spindle has fixed thereto a helical guide member and a complemental means coacts with said guide member to impart an incremental movement to said work spindle upon movement of said work table.

References Cited in the file of this patent

UNITED STATES PATENTS

| 772,894 | Le Blond et al. | Oct. 18, 1904 |
| 842,989 | Wingo | Feb. 5, 1907 |
| 1,703,218 | Wegner | Feb. 26, 1929 |
| 2,069,323 | Miller | Feb. 2, 1937 |
| 2,528,242 | Praeg | Oct. 31, 1950 |

FOREIGN PATENTS

| 983,278 | France | Feb. 7, 1951 |